(12) United States Patent
Frame et al.

(10) Patent No.: US 8,285,955 B2
(45) Date of Patent: Oct. 9, 2012

(54) METHOD AND APPARATUS FOR AUTOMATIC SOLID STATE DRIVE PERFORMANCE RECOVERY

(75) Inventors: Donald R. Frame, Apex, NC (US); Jeffrey R. Hobbet, Holly Springs, NC (US); Michael Scott Mettler, Durham, NC (US); Kenneth Dean Timmons, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 434 days.

(21) Appl. No.: 12/580,570

(22) Filed: Oct. 16, 2009

(65) Prior Publication Data

US 2011/0093674 A1    Apr. 21, 2011

(51) Int. Cl.
*G06F 12/00*    (2006.01)
*G06F 13/00*    (2006.01)
*G06F 13/28*    (2006.01)

(52) U.S. Cl. .................. 711/162; 711/103; 711/171

(58) Field of Classification Search .................. 711/162, 711/171, 103
See application file for complete search history.

(56) References Cited

U.S. PATENT DOCUMENTS

| | | | |
|---|---|---|---|
| 7,721,059 B2 * | 5/2010 | Mylly et al. | 711/165 |
| 7,788,460 B2 * | 8/2010 | Rothman et al. | 711/170 |
| 2006/0206753 A1 * | 9/2006 | Yamato et al. | 714/6 |
| 2009/0094433 A1 * | 4/2009 | Thomas et al. | 711/172 |

* cited by examiner

*Primary Examiner* — Jared Rutz
*Assistant Examiner* — Ryan Bertram
(74) *Attorney, Agent, or Firm* — Kunzler Law Group, PC

(57) ABSTRACT

A method and apparatus are disclosed for automatic solid state drive performance recovery. A detection module detects a first SSD exceeding a fragmentation threshold. A plurality of drives comprises the first SSD and stores a data copy of data stored on the first SSD. An erase module erases a mapping table for the first SSD. The mapping table maps Logical Block Addresses LBA to physical addresses for the first SSD. A rebuild module rebuilds the data and the mapping table on the first SSD from the data copy.

20 Claims, 7 Drawing Sheets

500

| LBA 510a | Physical Address 515a |
|---|---|
| LBA 510b | Physical Address 515b |
| LBA 510c | Physical Address 515c |
| LBA 510d | Physical Address 515d |

505a, 505b, 505c, 505d

METHOD AND APPARATUS FOR AUTOMATIC SOLID STATE DRIVE PERFORMANCE RECOVERY

BACKGROUND

1. Field

The subject matter disclosed herein relates to performance recovery and more particularly relates to automatic solid state drive performance recovery.

2. Description of the Related Art

Solid state drives (SSD) are often used in place of hard disk drives and other storage devices. SSD support quick booting, fast access, low power consumption, and small form factors. Unfortunately, the performance of an SSD will degrade over time as the SSD is repeatedly written to. The performance degradation is due to fragmentation of a mapping table.

SUMMARY

From the foregoing discussion, there is a need for a method and apparatus that automatically recovers performance for a SSD. Beneficially, such a method and apparatus would restore the SSD to a desired performance level after performance degrades.

The embodiments of the present invention have been developed in response to the present state of the art, and in particular, in response to the problems and needs in the art that have not yet been fully solved by currently available performance recovery methods. Accordingly, the embodiments have been developed to provide a method and apparatus that overcome many or all of the above-discussed shortcomings in the art.

A method is presented for recovering performance. In one embodiment, the method includes detecting a first SSD exceeding a fragmentation threshold, erasing a mapping table, and rebuilding data and the mapping table.

A detection module detects a first SSD exceeding a fragmentation threshold. A plurality of drives comprises the first SSD and stores a data copy of data stored on the first SSD.

An erase module erases a mapping table for the first SSD. The mapping table maps Logical Block Addresses (LBA) to physical addresses for the first SSD. A rebuild module rebuilds the data and the mapping table on the first SSD from the data copy.

The apparatus to recover performance is provided with a plurality of modules configured to functionally execute the steps of the method. The modules include a detection module, an erase module, and a rebuild module.

The detection module detects a first SSD exceeding a fragmentation threshold. A plurality of drives comprises the first SSD and stores a data copy of data stored on the first SSD.

The erase module erases a mapping table for the first SSD. The mapping table maps LBA to physical addresses for the first SSD. A rebuild module rebuilds the data and the mapping table on the first SSD from the data copy.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

Embodiments recover the performance of an SSD after the performance of the SSD has degraded due to defragmentation of the mapping table. Embodiments may recover the performance by detecting the SSD exceeding a performance threshold, erasing a mapping table mapping LBA for the SSD to physical addresses of the SSD, and rebuilding data on the SSD and the mapping table. These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
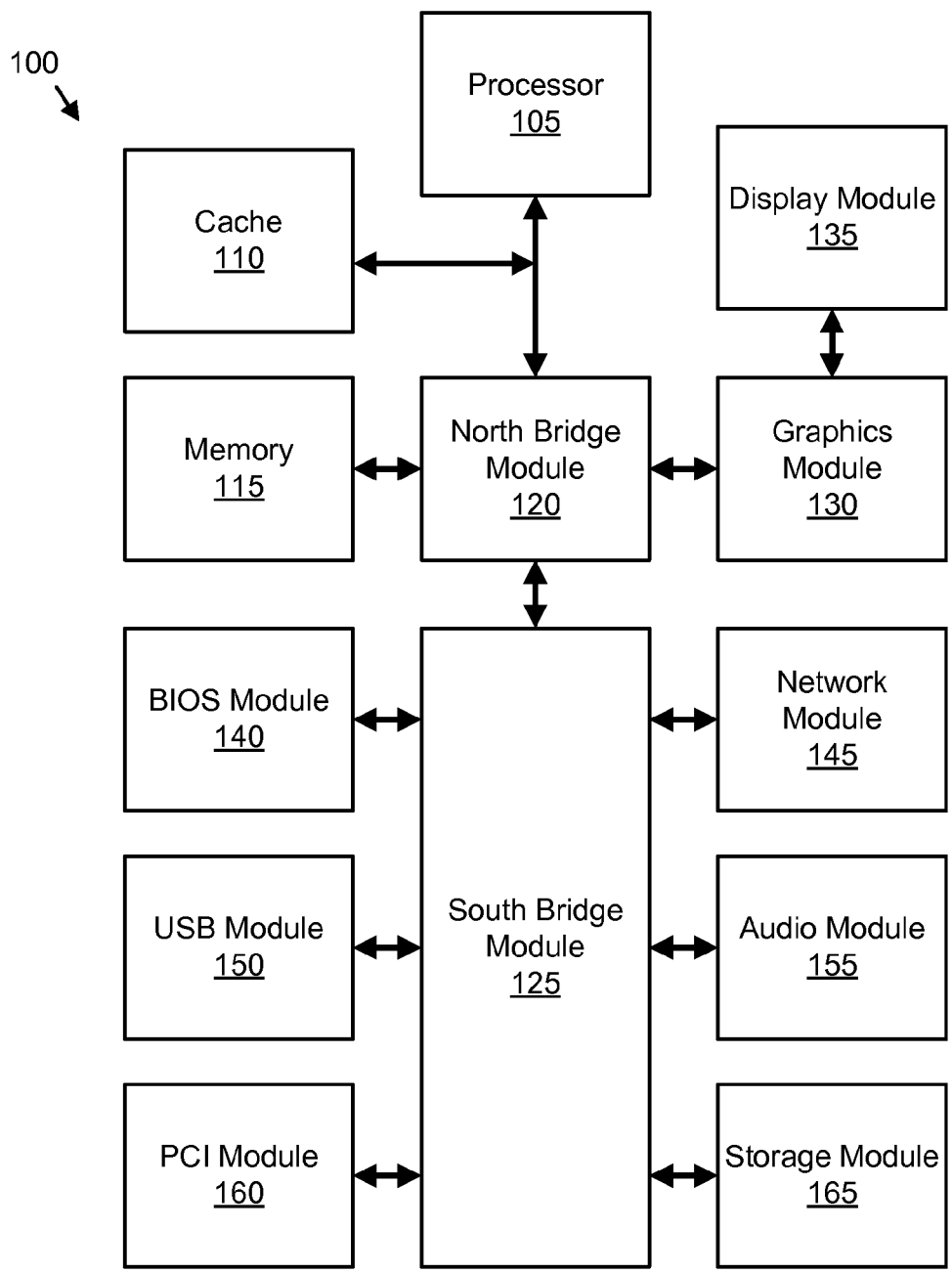
FIG. 1 is a schematic block diagram illustrating one embodiment of a computer.

FIG. 1 is a schematic block diagram illustrating one embodiment of a computer 100. The computer 100 includes a processor 105, a cache 110, a memory 115, a north bridge module 120, a south bridge module 125, a graphics module 130, a display module 135, a basic input/output system (BIOS) module 140, a network module 145, a universal serial bus (USB) module 150, an audio module 155, a peripheral component interconnect (PCI) module 160, and a storage module 165. One of skill in the art will recognize that other configurations of a computer or multiple computers may be employed with the embodiments described herein.

The processor 105, cache 110, memory 115, north bridge module 120, south bridge module 125, graphics module 130, display module 135, BIOS module 140, network module 145, USB module 150, audio module 155, PCI module 160, and storage module 165, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 115 stores computer readable programs. The processor 105 executes the computer readable programs as is well known to those skilled in the art. The computer readable programs may be tangibly stored in the storage module 165. The storage module 165 may comprise at least one SSD. In addition, the storage module 165 may include a hard disk drive, an optical storage device, a holographic storage device, a micromechanical storage device, or the like.

The processor 105 may communicate with the cache 110 through a processor interface bus to reduce the average time to access memory 115. The cache 110 may store copies of instructions and data from the most frequently used memory 115 locations. The computer 100 may use one or more caches 110 such as a Double Data Rate 2 (DDR2) cache memory or the like.

The north bridge module 120 may communicate with and provide bridging functionality between the processor 105, the graphic module 130, the memory 115, and the cache 110. The processor 105 may be connected to the north bridge module 120 over a, for example, 667 Megahertz (MHz) front side bus.

The north bridge module 120 may be connected to the south bridge module 125 through a direct media interface (DMI) bus. The DMI bus may provide a high-speed, bi-directional, point-to-point link supporting a clock rate for example of one Gigabytes per second (1 GBps) in each direction between the north bridge module 120 and the south bridge module 125. The south bridge module 125 may support and communicate with the BIOS module 140, the network module 145, the PCI module 160, and the storage module 165.

The PCI module 160 may communicate with the south bridge module 125 for transferring data or power to peripheral devices. The PCI module 160 may include a PCI bus for attaching the peripheral devices. The PCI bus can logically connect several peripheral devices over the same set of connections. The peripherals may be selected from a printer, a joystick, a scanner, or the like. The PCI module 160 may also comprise an expansion card as is well known to those skilled in the art.

The BIOS module 140 may communicate instructions through the south bridge module 125 to boot the computer 100, so that computer readable software instructions stored on the storage module 165 can load, execute, and assume control of the computer 100. Alternatively, the BIOS module 140 may comprise a coded program embedded on a chipset that recognizes and controls various devices that make up the computer 100.

The network module 145 may communicate with the south bridge module 125 to allow the computer 100 to communicate with other devices over a network. The devices may include routers, bridges, computers, printers, and the like.

The display module 135 may communicate with the graphic module 130 to display information as will be described hereafter. The display module 135 may be a cathode ray tube (CRT), a liquid crystal display (LCD) monitor, or the like.

The USB module 150 may communicate with one or more USB compatible devices over a USB bus. The audio module 155 may generate an audio output.

Figure 2:
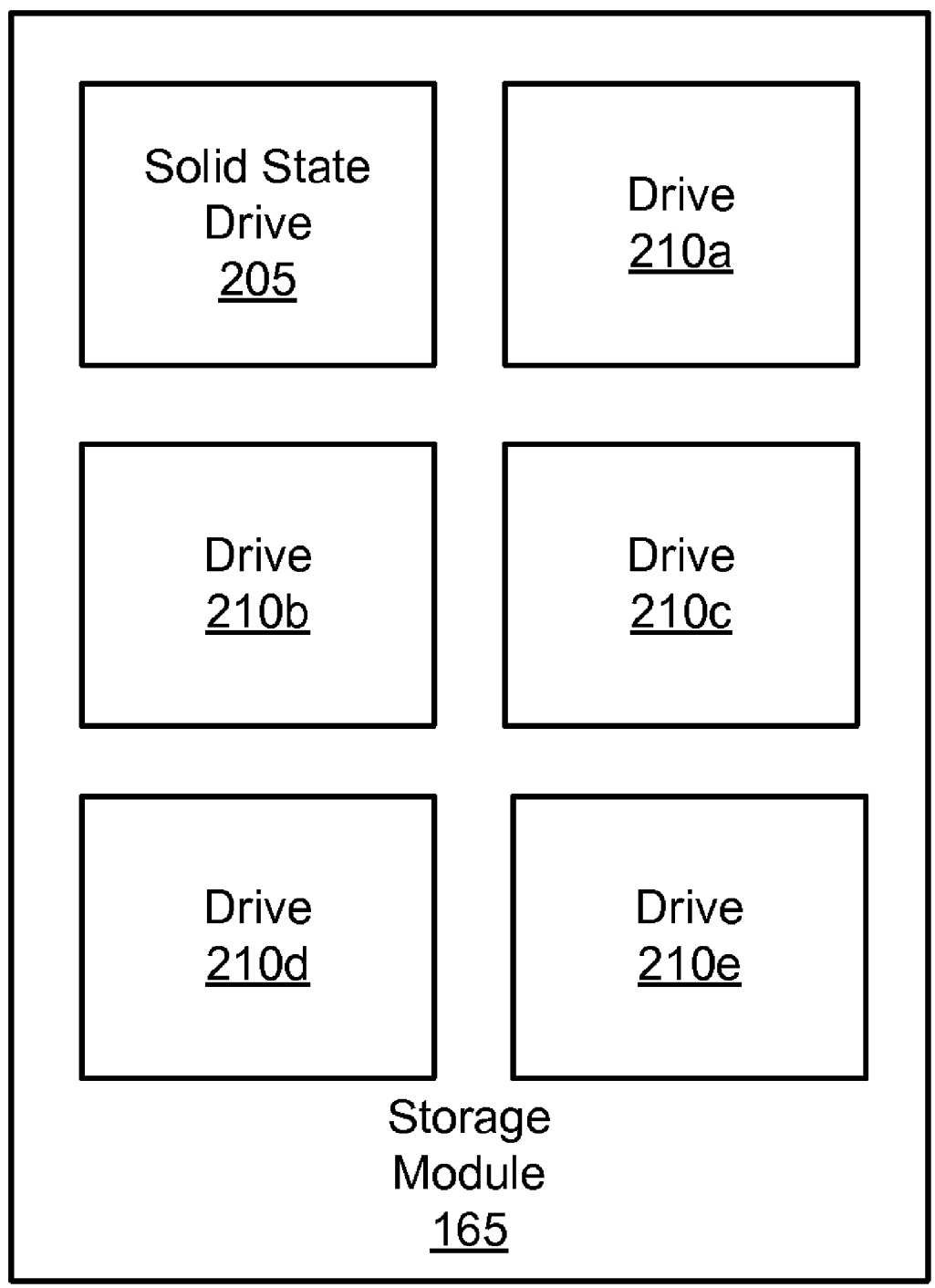
FIG. 2 is a schematic block diagram illustrating one embodiment of a storage module.

FIG. 2 is a schematic block diagram illustrating one embodiment of a storage module 165. The storage module 165 is the storage module 165 of FIG. 1. The description of the storage module 165 refers to elements of FIG. 1, like numbers referring to like elements.

The storage module 165 includes a least one SSD 205. In addition, the storage module 165 comprises other drives 210. The other drives 210 may be SSD, hard disk drives, optical storage devices, holographic storage devices, micromechanical storage devices, or the like, or any combination thereof. In one embodiment, data stored on the SSD 205 is stored as at least one data copy on a least one other drive 210. In a certain embodiment, the data stored on the SSD 205 is divided into portions, with each portions stored on a least one other drive 210.

In one embodiment, the SSD 205 and other drives 210 are organized as a Redundant Array of Independent Disks (RAID) system that supports one or more redundancy schemes such as RAID 0, RAID 1, or the like. The data and the data copy maybe stored redundantly across the SSD 205 and the other drives 210.

Figure 3:
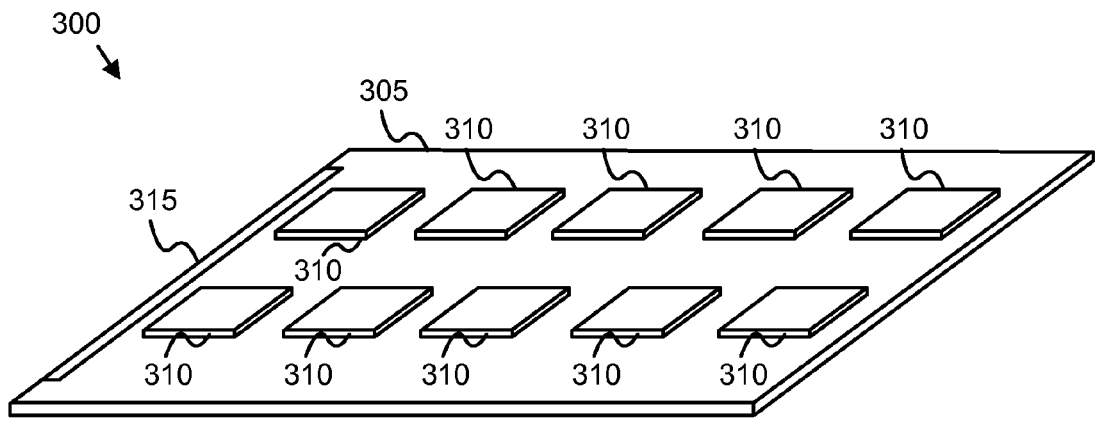
FIG. 3 is a perspective drawing illustrating one embodiment of a SSD.

FIG. 3 is a perspective drawing illustrating one embodiment of a SSD 300. The SSD 300 may be the SSD 205 of FIG.

2 with the circuit board form factor. The description of the SSD 300 may refer to elements of FIGS. 1-2, like numbers referring to like elements.

The SSD 300 comprises a printed circuit board 305 mounting a plurality of semiconductor devices 310. The SSD 300 may communicate with a motherboard of the computer 100 through a connector 315. Each semiconductor device 310 may be a non-volatile memory device such as a flash memory or the like. In an alternate embodiment, each semiconductor device 310 is organized as an individual SSD. Thus the printed circuit board 305 may comprise a plurality of SSD 205. The SSD 300 may also comprise a plurality of support semiconductor devices, discrete electrical components, cables, cable connectors, and the like that are not shown, but that are well known to those of skill in the art.

Figure 4:
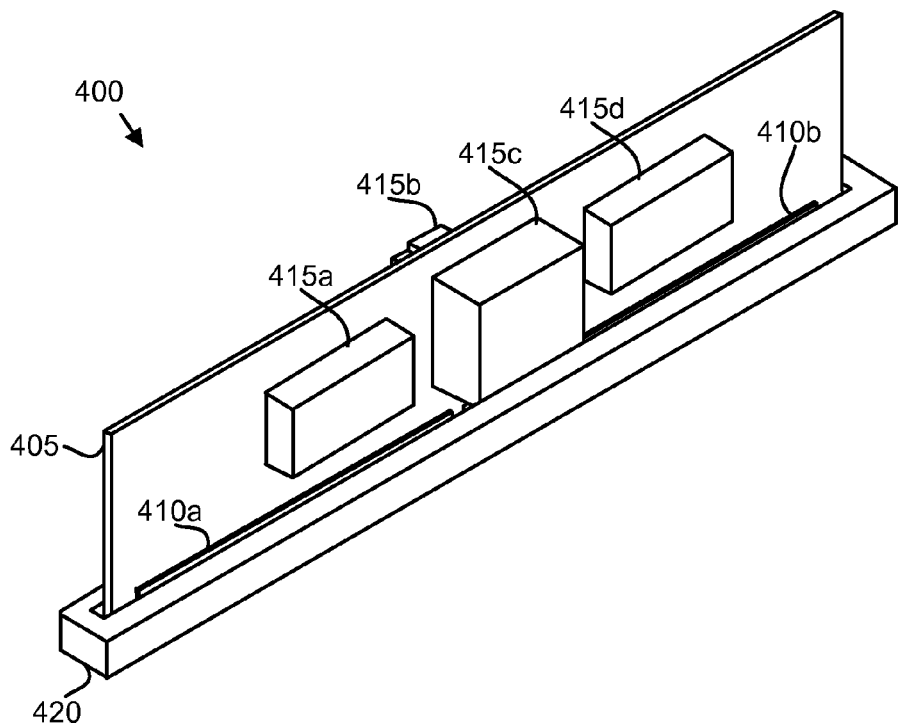
FIG. 4 is a perspective drawing illustrating one alternate embodiment of a SSD.

FIG. 4 is a perspective drawing illustrating one alternate embodiment of a SSD 400. The SSD 400 may be the SSD 205 FIG. 2 with a Dual In-line Memory Module (DIMM) form factor. The description of the SSD 400 may refer to elements of FIGS. 1-3, like numbers referring to like elements. The SSD 400 is shown comprising a printed circuit board 405, one or more connectors 410, one or more semiconductor devices 415, and a connector socket 420.

The connector socket 420 may mount to a motherboard of the computer 100. The printed circuit board 405 may interface with the connector socket 420 through the connectors 410. Electrical traces may interconnect the semiconductor devices 415 and the connectors 410. The DIMM form factor may allow a variable number of SSD 205 to be added to the computer 100. For example, the computer may be configured with four SSD 400.

Figures 5, 6:
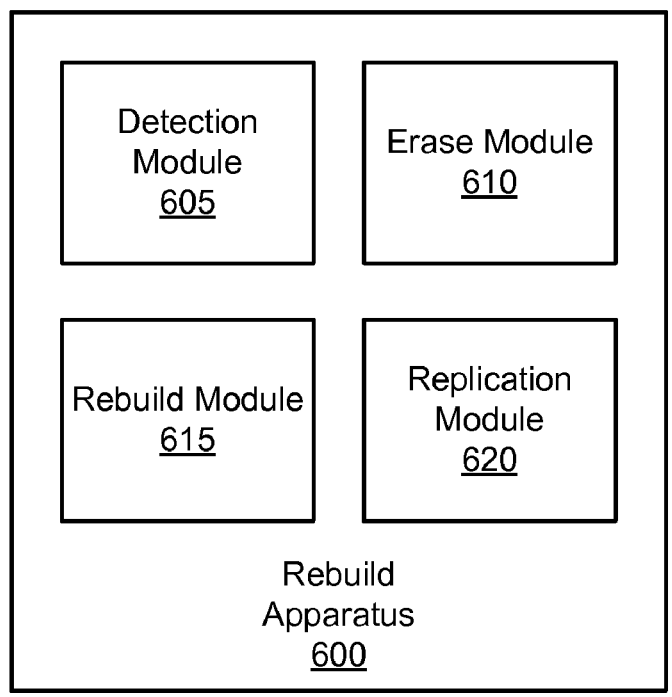
FIG. 5 is a schematic block diagram illustrating one embodiment of a mapping table.
FIG. 6 is a schematic block diagram illustrating one embodiment of a rebuild apparatus.

FIG. 5 is a schematic block diagram illustrating one embodiment of a mapping table 500. The mapping table 500 may be stored in the SSD 205 of FIG. 2. The description of the mapping table 500 may refer to elements of FIGS. 1-4, like numbers referring to like elements.

The mapping table 500 includes a plurality of entries 505. Each entry 505 includes an LBA 510 and the corresponding physical address 515 for the LBA 510. When data is written to the SSD 205, the LBA 510 for the data is written to the mapping table 500. In addition the physical address 515 where the data is stored on the SSD 205 is also written to the mapping table 500.

The computer 100 typically writes data to the SSD 205 in data blocks of a first specified size. For example, the computer 100 may write 512 byte data blocks to the SSD 205. However, the SSD 205 may be organized in data blocks of a second specified size. For example, the SSD 205 may be organized in address blocks of 4 kilobytes (kB). In addition, the SSD 205 may write modified portions of data to new address blocks. The rewriting of modified data and writing of data blocks with a first specified size in address blocks of a second specified size fragments entries 505 in the mapping table 500.

As the computer 100 writes and modifies data to the SSD 205, the mapping table 500 becomes increasingly fragmented, with data images being fragmented between an increasing number of SSD address blocks. As a result, the performance of the SSD 205 degrades. For example, the read latency and access time of the SSD 205 may both increase. Embodiments may recover the performance of the SSD 205 as will be described hereafter.

FIG. 6 is a schematic block diagram illustrating one embodiment of a rebuild apparatus 600. The rebuild apparatus 600 may be embodied in the computer 100 of FIG. 1. The description of the rebuild apparatus 600 may refer to elements FIGS. 1-5, like numbers referring to like elements. The rebuild apparatus may include a detection module 605, an erase module 610, a rebuild module 615, and a replication module 620. The rebuild apparatus 600 rebuilds the mapping table 500 to recover the performance of the SSD 205.

In one embodiment, the detection module 605, the erase module 610, the rebuild module 615, and the replication module 620 each comprise a computer readable storage medium. The computer readable storage medium stores a computer readable program on a tangible storage device such as the memory 115, the BIOS module 140, and the storage module 165. When the computer readable program is executed on a processor 105, the computer readable program causes the computer 100 to perform one or more specified operations or functions to recover the performance of the SSD 205.

The detection module 605 detects a first SSD exceeding a fragmentation threshold. The fragmentation threshold may be for the mapping table 500. Alternatively, the fragmentation threshold may refer to the general organization of data within the SSD. In one embodiment, the fragmentation threshold is determined relative to the performance of the first SSD 205. The fragmentation threshold and the detection thereof will be described hereafter.

The first SSD may be the SSD 205 of FIG. 2. The plurality of drives 210 of the storage module 165 comprises the first SSD 205. In addition, the plurality of drives 210 may store a data copy of data stored on the first SSD 205. For example, the first SSD 205 may store a data image. Each of the plurality of drives 210 may store a copy of a portion of the data image as the data copy. In one embodiment, the plurality of drives 210 stores multiple data copies of each portion of the data image. In an alternate embodiment, a drive 210 of the plurality of drives 210 mirrors the first SSD 205 as the data copy.

In one embodiment, the replication module 620 replicates the data stored on a first SSD 205 to the other drives 210 as the data copy. The replication module 620 may copy the data to the data copy in response to the detection module 605 detecting the first SSD 205 exceeding the fragmentation threshold. Alternatively, the replication module 620 may copy the data to the data copy as part of a regular backup operation. For example, the replication module 620 may copy each change to the data to the data copy. In another example, the replication module 620 may copy the data to the data copy at a specified backup time. In a certain embodiment, the replication module 620 replicates the data to the data copy as part of a RAID data management process.

The erase module 610 erases the mapping table 500 for the first SSD 205. In one embodiment, the erase module 610 erases the mapping table 500 in response to the detection module 505 detecting the first SSD 205 exceeding the fragmentation threshold. The erase module 610 may overwrite the mapping table 500 to erase the mapping table 500. Alternatively, the erase module 610 may erase a pointer to the mapping table on the SSD 205 to erase the mapping table 500.

The rebuild module 615 rebuilds the data and the mapping table 500 on the first SSD 205 from the data copy. In one embodiment, the rebuild module 615 rebuilds the data and the mapping table 500 on the first SSD 205 in response to the erase module 610 erasing the mapping table 500 for the first SSD 205. For example, if each of the drives 210 of the plurality of drives 210 stores a portion of the data copy, the rebuild module 615 may copy the portions of the data copy to the first SSD 205 and rebuild the mapping table 500 by mapping the LBA 510 for the portions of the data copy to physical addresses 515 on the first SSD 205 of the portions of the data copy.

By detecting the first SSD 205 exceeding the fragmentation threshold, erasing the mapping table 500, and rebuilding the data and the mapping table 500 on the first SSD 205 from the data copy, the rebuild apparatus 600 replaces an original, fragmented mapping table 500 with a mapping table 500 that accesses the same data, but that is reorganized for improved performance.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
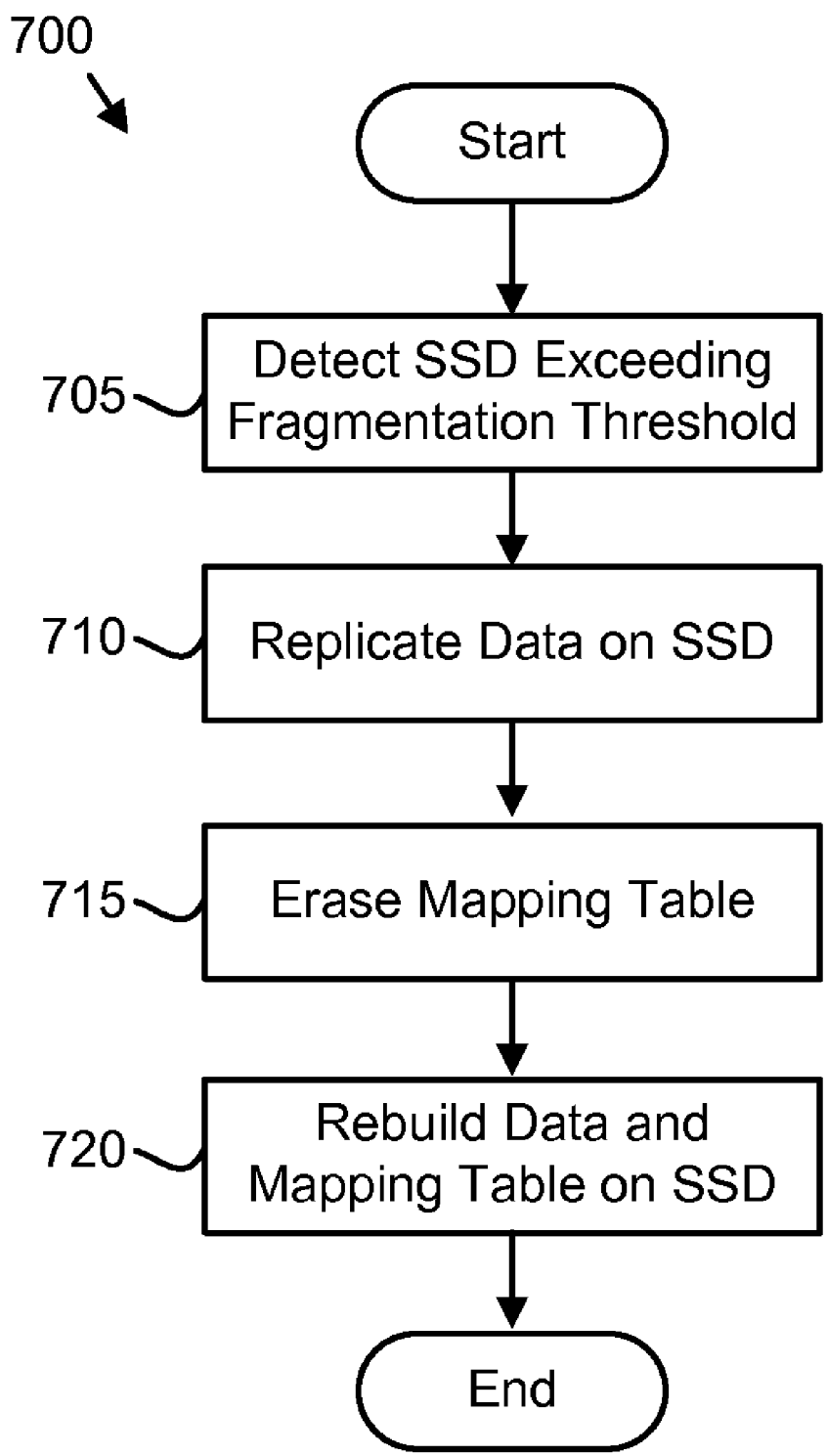
FIG. 7 is a schematic flow chart diagram illustrating one embodiment of a performance recovery method.

FIG. 7 is a schematic flow chart diagram illustrating one embodiment of a performance recovery method 700. The method 700 substantially includes the steps to carry out the functions presented above with respect to the operation of the described apparatus of FIG. 1-6. In one embodiment, the method 700 is implemented with a computer readable storage medium storing a computer readable program on a tangible storage device. The computer readable storage medium may be integrated into a computing system, such as the computer 100, wherein the computer readable program executed by the computing system performs the method 700.

The method 700 begins, and the detection module 605 detects 705 the first SSD 205 exceeding the fragmentation threshold. A plurality of drives 210 of FIG. 2 includes the first SSD 205. The first SSD 205 stores data. The plurality of drives 210 stores a data copy of the data stored on the first SSD 205.

In one embodiment, the fragmentation threshold is detected when a specified fragmentation time interval is exceeded. The specified fragmentation time interval may be in the range of 15 to 120 days. In a certain embodiment, the specified fragmentation time interval is in the range of 30 to 60 days.

The detection module 605 may detect 705 the first SSD 205 exceeding the fragmentation threshold when a time interval from a last performance recovery operation to a present time exceeds the specified fragmentation time interval. In a prophetic example, the specified fragmentation time interval may be 45 days. In addition, the last performance recovery operation for the first SSD 205 may have been performed 46 days earlier. As a result, the detection module 605 may detect 705 the first SSD 205 exceeding the fragmentation threshold as the time interval exceeds the fragmentation threshold.

In one embodiment, the detection module 605 detects 705 the first SSD 205 exceeding the fragmentation threshold when the specified fragmentation time interval is exceeded and a specified inactivity is detected. The specified inactivity may be a time when no inputs are received by the computer 100 for a specified inactivity interval. The specified inactivity interval may be in the range of 15 to 90 minutes. For example, if the specified inactivity interval is 30 minutes and computer 100 receives no inputs for over 30 minutes, the detection module 605 may detect the specified inactivity.

Alternatively, the specified inactivity may be a time when processor activity is low or storage device 165 accesses are low for the specified inactivity interval. For example, if the specified inactivity interval is 30 minutes and the storage module 165 is not accessed for over 30 minutes, the detection module 605 may detect the specified inactivity.

In one embodiment, the detection module 605 detects the specified inactivity during a specified idle interval. The specified idle interval may be from a start time ranging from 10 p.m. to 2 p.m. to an end time ranging from 4 a.m. to 7 a.m. For example, the specified idle interval may be from 1 a.m. to 5 a.m. Thus if the specified inactivity interval is 30 minutes, the detection module 605 may detect the specified inactivity after no inputs are received by the computer 100 for 30 minutes and the time is after 1 a.m. and before 5 a.m.

Alternatively, the detection module 605 detects 705 the first SSD 205 exceeding the fragmentation threshold when a performance of the first SSD 205 is less than a specified performance threshold. The detection module 605 may monitor the performance of the first SSD 205. If the performance of the first SSD 205 falls below the specified performance threshold, the detection module 605 may detect 705 the fragmentation threshold. The performance may be an SSD access time, an SSD latency, or the like.

In one embodiment, the detection module 605 detects 705 the first SSD 205 exceeding the fragmentation threshold when the performance of the first SSD 205 is less than the specified performance threshold and the specified inactivity is detected. For example, the detection module 605 may detect 705 the first SSD 205 exceeding the fragmentation threshold when the SSD latency exceeds a specified latency, and after no inputs are received by the computer 100 for 30 minutes and the time is after 1 a.m. and before 5 a.m.

In one embodiment, the detection module 605 detects 705 that the performance of the first SSD 205 is less than the specified performance threshold from a status flag. In one embodiment, the status flag is incorporated in an extension of the Self-Monitoring, Analysis, and Reporting Technology (S.M.A.R.T.) monitoring system standard of the AT attachment (ATA) standard. In an alternate embodiment, the status flag is not part of a reporting standard. The status flag may indicate a performance value such as latency, access time, or the like. Alternatively, the status flag may be a binary indicator that indicates whether or not the performance of the first SSD 205 is less than the specified performance threshold.

In one embodiment, the replication module 620 replicates 710 the data stored on a first SSD 205 to the other drives 210 as the data copy. The replication module 620 may replicate 710 the data to the data copy in response to the detection module 605 detecting 705 the first SSD 205 exceeding the fragmentation threshold. Alternatively, the replication module 620 may replicate 710 the data to the data copy in response to a backup policy. In one embodiment, the replication module 620 replicates 710 the data as part of a RAID strategy.

In a certain embodiment, the replication module 620 replicates 710 the data stored on the first SSD 205 to the data copy as part of a regular backup of the data. In addition, when the detection module 605 detects 705 the first SSD 205 exceeding a fragmentation threshold, the replication module 620 may examine the data copy and copy any portions of the data that have changed since the last regular backup to the data copy so that the data copy is a minor image of the data.

The erase module 610 erases 715 the mapping table 500 for the first SSD 205. Erasing the mapping table 500 may effectively erase all data stored on the first SSD 205 as no physical addresses 515 can be identified for an LBA 510.

In one embodiment, the erase module 610 erases 715 the mapping table 500 in response to the detection module 505 detecting 705 the first SSD 205 exceeding the fragmentation threshold. Alternatively, the erase module erases 715 a mapping table 500 in response to the detection module 505 detecting 705 the first SSD 205 exceeding the fragmentation threshold and the replication module 620 replicating 710 the data on the first SSD 205 to the data copy.

In one embodiment, the erase module 610 displays a warning message on the display module 135 of the computer 100. In addition, the erase module 610 may delay the erasure 715 of the mapping table 500 if directed to do so by a user responding to the warning message.

The rebuild module 615 rebuilds 720 the data and the mapping table 500 on the first SSD 205 from the data copy. In one embodiment, the rebuild module 515 rebuilds 720 the data and the mapping table 500 on the first SSD 205 in response to the erase module 510 erasing 715 the mapping table 500 for the first SSD 205.

In one embodiment, the rebuild module 615 rebuilds 720 the data on the first SSD 205 with contiguous portions of the data organized in blocks of a specified size. For example, the rebuild module 615 may rebuild 720 the data with the data organized in 4 kB data blocks that correspond to 4 kB address blocks of the first SSD 205. Rebuilding 720 the data and the mapping table 500 on the first SSD 205 mitigates the fragmentation and recovers the performance of the first SSD 205.

Figure 8:
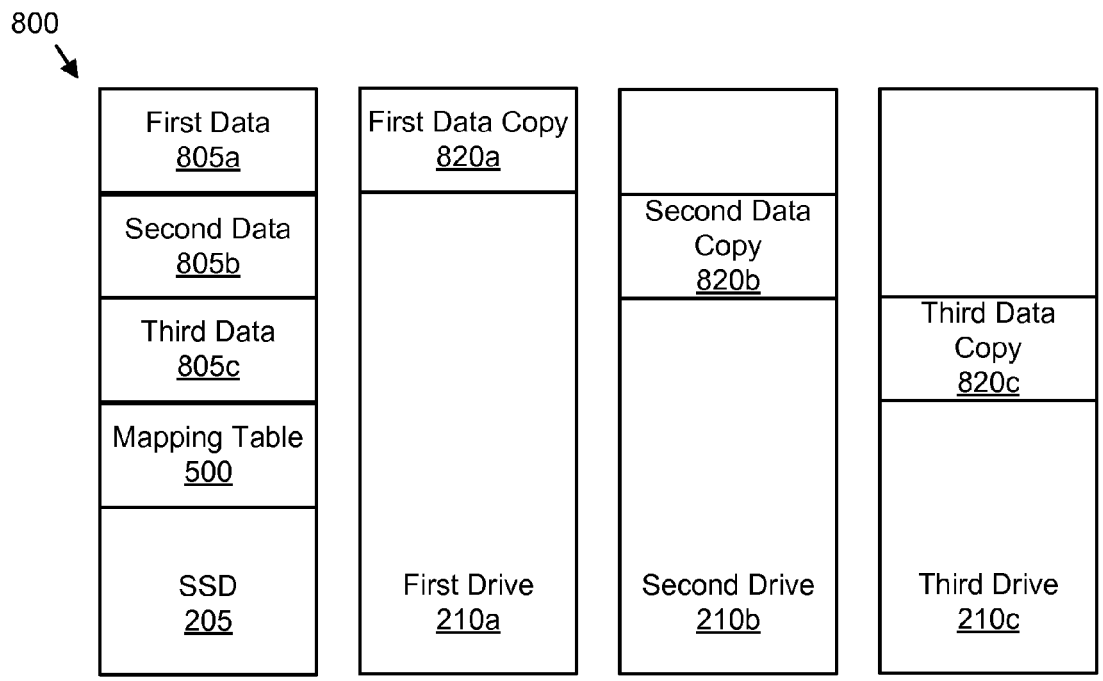
FIG. 8 is a schematic block diagram illustrating one embodiment of data stored on drives.

FIG. 8 is a schematic block diagram illustrating one embodiment of data stored in drives 800. The data spaces of the SSD 205, a first drive 210a, a second drive 210b, and a third drive 210c of FIG. 2 are shown. The description of the data stored in drives 800 refers to elements of FIGS. 1-7, like numbers referring to like elements.

The data space of the first SSD 205 includes data comprising first data 805a, second data 805b, and third data 805c. The data space of the first drive 210a stores a first data copy 820a of the first data 805a. The data space of the second drive 210b stores a second data copy 820b of the second data 805b. In addition, the data space of the third drive 210c stores of a third data copy 820c of the third data 805c. The data space of the first SSD 205 is also shown storing the mapping table 500.

Figure 9:
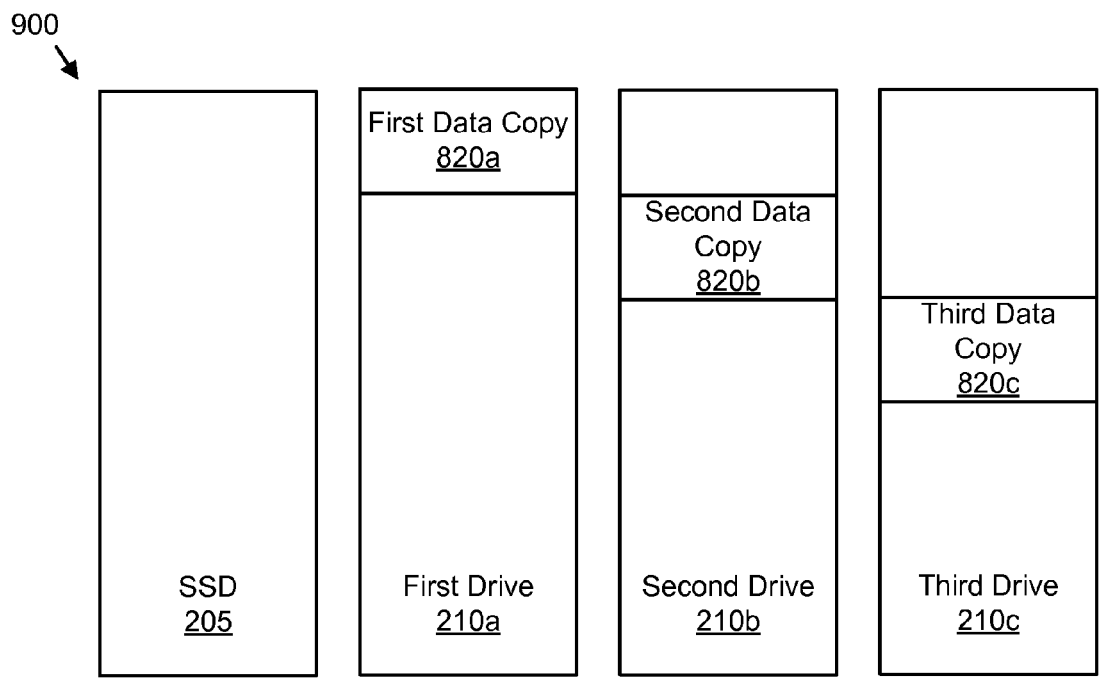
FIG. 9 is a schematic block diagram illustrating one embodiment of mapping table erasure.

FIG. 9 is a schematic block diagram illustrating one embodiment of mapping table erasure 900. The data spaces of the first SSD 205, the first drive 210a, the second drive 210b, and the third drive 210c of FIG. 8 are shown after the erase module 610 erases 715 the mapping table 500. The first data 805a, the second data 805b, the third data 805c, and mapping table 500 are no longer accessible on the first SSD 205. However, the first, second, and third drives 210a-c still store the first, second, and third data copies 820a-c.

Figure 10:
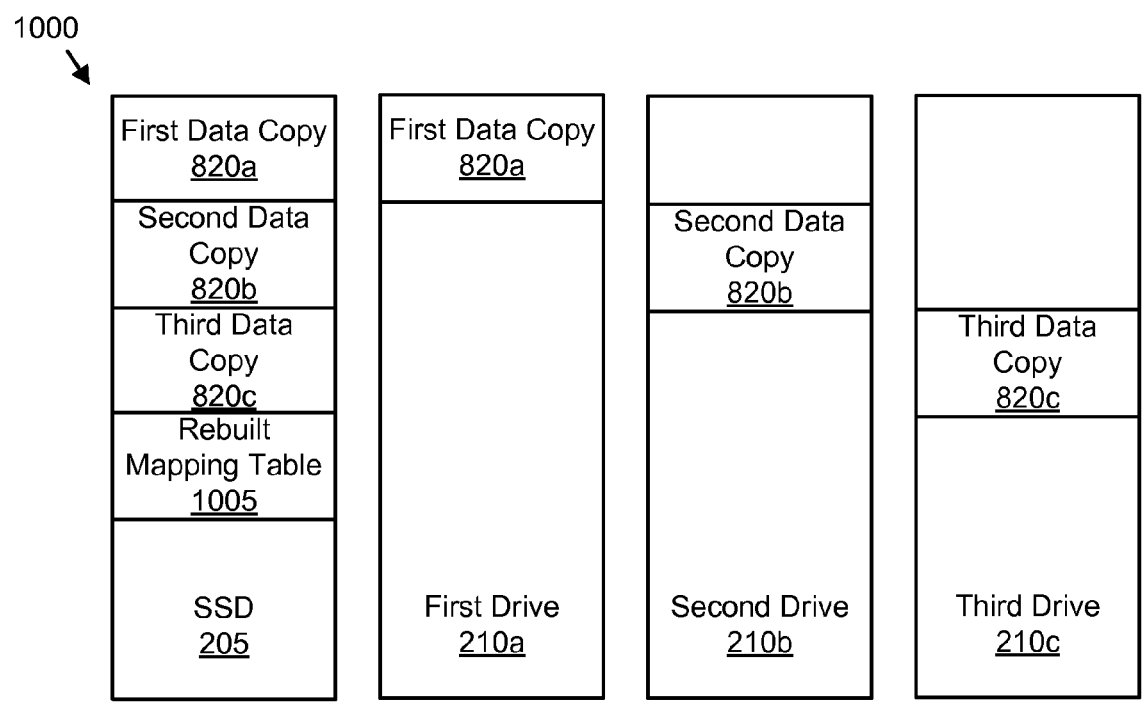
FIG. 10 is a schematic block diagram illustrating one embodiment of data and mapping table rebuild.

FIG. 10 is a schematic block diagram illustrating one embodiment of data and mapping table rebuild 1000. The data spaces of the first SSD 205, the first drive 210a, the second drive 210b, and the third drive 210c of FIGS. 8 and 9 are shown after the rebuild module 615 rebuilds 720 the first, second, and third data 805a-c and the mapping table 500 on the first SSD 205 by copying the first, second, and third data copies 820a-c to the first SSD 205. As the data copies 820 are written to the first SSD 205, the mapping table 500 is rebuilt as the rebuilt mapping table 1005. Because the rebuilt mapping table 1005 is not fragmented like the mapping table 500 that the rebuilt mapping table 1005 replaced, the performance of the first SSD 205 is recovered.

Embodiments recover the performance of the first SSD 205 by detecting the first SSD 205 exceeding a fragmentation threshold, erasing the mapping table 500 for the first SSD 205, and rebuilding the data 805 and the mapping table 500 of the first SSD 205 from the data copy 820 stored in other drives 210. Embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage medium storing a computer readable program on a tangible storage device, wherein the computer readable program when executed on a computer causes the computer to recover performance by:
   detecting a first solid state drive (SSD) exceeding a fragmentation threshold, wherein a plurality of drives comprises the first SSD and stores a data copy of data stored on the first SSD;
   erasing a mapping table for the first SSD in response to detecting the first SSD exceeding the fragmentation threshold, the mapping table mapping logical block addresses (LBA) to physical addresses for the first SSD, so that no physical addresses are identified for each LBA; and
   rebuilding the data and the mapping table on the first SSD from the data copy.

2. The computer readable storage medium of claim 1, wherein each drive of the plurality of drives stores a portion of the data copy.

3. The computer readable storage medium of claim 1, wherein the fragmentation threshold is detected when a specified fragmentation time interval is exceeded.

4. The computer readable storage medium of claim 1, wherein the fragmentation threshold is detected when a specified fragmentation time interval is exceeded and a specified inactivity is detected.

5. The computer readable storage medium of claim 1, wherein the fragmentation threshold is detected when a performance of the first SSD is less than a specified performance threshold.

6. The computer readable storage medium of claim 5, wherein the performance of the first SSD less than the specified performance threshold is determined from a status flag.

7. The computer readable storage medium of claim 1, wherein the computer readable program further causes the computer to rebuild the data on the first SSD with contiguous portions of the data organized in blocks of a specified size.

8. The computer readable storage medium of claim 1, wherein the plurality of drives are each SSD.

9. An apparatus comprising:
   a detection module detecting a first SSD exceeding a fragmentation threshold, wherein a plurality of drives comprises the first SSD and stores a data copy of data stored on the first SSD;
   an erase module erasing a mapping table for the first SSD in response to detecting the first SSD exceeding the fragmentation threshold, the mapping table mapping LBA to physical addresses for the first SSD, so that no physical addresses are identified for each LBA; and
   a rebuild module rebuilding the data and the mapping table on the first SSD from the data copy.

10. The apparatus of claim 9, wherein the fragmentation threshold is detected when a specified fragmentation time interval is exceeded.

11. The apparatus of claim 9, wherein the fragmentation threshold is detected when a specified fragmentation time interval is exceeded and a specified inactivity is detected.

12. The apparatus of claim 9, wherein the fragmentation threshold is detected when a performance of the first SSD is less than a specified performance threshold.

13. The apparatus of claim 12, wherein the performance of the first SSD less than the specified performance threshold is determined from a status flag.

14. The apparatus of claim 9, the rebuild module rebuilding the data on the first SSD with contiguous portions of the data organized in blocks of a specified size.

15. A method comprising:
  detecting a first SSD exceeding a fragmentation threshold, wherein a plurality of drives comprises the first SSD and stores a data copy of data stored on the first SSD;
  erasing a mapping table for the first SSD in response to detecting the first SSD exceeding the fragmentation threshold, the mapping table mapping LBA to physical addresses for the first SSD, so that no physical addresses are identified for each LBA; and
  rebuilding the data and the mapping table on the first SSD from the data copy.

16. The method of claim 15, wherein the fragmentation threshold is detected when a specified fragmentation time interval is exceeded.

17. The method of claim 15, wherein the fragmentation threshold is detected when a specified fragmentation time interval is exceeded and a specified inactivity is detected.

18. The method of claim 15, wherein the fragmentation threshold is detected when a performance of the first SSD is less than a specified performance threshold.

19. The method of claim 18, wherein the performance of the first SSD less than the specified performance threshold is determined from a status flag.

20. The method of claim 15, further comprising rebuilding the data on the first SSD with contiguous portions of the data organized in blocks of a specified size.

* * * * *